United States Patent
Shimoji et al.

(10) Patent No.: US 10,233,832 B2
(45) Date of Patent: Mar. 19, 2019

(54) EXHAUST DEVICE OF MULTI-CYLINDER ENGINE

(71) Applicant: Mazda Motor Corporation, Aki-gun, Hiroshima (JP)

(72) Inventors: Hiroki Shimoji, Hatsukaichi (JP); Tsukasa Hoshino, Hiroshima (JP); Ryo Yamamoto, Hiroshima (JP); Haruna Yanagida, Hiroshima (JP); Koji Endo, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 111 days.

(21) Appl. No.: 14/825,576

(22) Filed: Aug. 13, 2015

(65) Prior Publication Data

US 2016/0061089 A1    Mar. 3, 2016

(30) Foreign Application Priority Data

Sep. 1, 2014    (JP) ................................ 2014-176996

(51) Int. Cl.
*F01N 3/10* (2006.01)
*F02B 77/08* (2006.01)
(Continued)

(52) U.S. Cl.
CPC ............ *F02B 77/086* (2013.01); *F01N 3/101* (2013.01); *F01N 13/008* (2013.01);
(Continued)

(58) Field of Classification Search
CPC .. F01N 13/008; F01N 13/107; F01N 13/1805; F01N 3/101; F01N 2340/00;
(Continued)

(56) References Cited

U.S. PATENT DOCUMENTS 5,867,985 A * 2/1999 Furuhashi ............. F01N 13/008
60/323
6,962,049 B2    11/2005 Ashida et al.
(Continued)

FOREIGN PATENT DOCUMENTS

JP    H11148345 A    6/1999
JP    2001003743 A    1/2001
(Continued)

*Primary Examiner* — Laert Dounis
*Assistant Examiner* — Matthew T Largi
(74) *Attorney, Agent, or Firm* — Alleman Hall Creasman & Tuttle LLP (57) ABSTRACT

An exhaust purification device of a multi-cylinder engine which improves exhaust gas purification performance by substantially uniforming a flow rate of exhaust gas throughout a treatment carrier such as a catalyst and improving dispersibility of the exhaust gas from the multi-cylinder engine to the catalyst and other components in the exhaust purification device wherein two collecting pipes are arranged at substantially symmetric positions across a partition plate part, which has a linear cross sectional shape, and is arranged centrally between the pipes which are each formed into D-shaped cross sectional shapes and comprise a first straight line part, a pair of second straight line parts connected with respective ends of a first straight line part and arranged to be substantially parallel with each other, and a circular arc part that connects ends of a pair of second straight line parts on opposite sides of the first straight line part.

3 Claims, 10 Drawing Sheets

(51) Int. Cl.
*F01N 13/18* (2010.01)
*F01N 13/00* (2010.01)
*F02B 75/18* (2006.01)
*F01N 13/10* (2010.01)

(52) U.S. Cl.
CPC ....... *F01N 13/107* (2013.01); *F01N 13/1805* (2013.01); *F02B 75/18* (2013.01); *F01N 2340/00* (2013.01); *F01N 2340/02* (2013.01); *F01N 2340/04* (2013.01); *F01N 2470/10* (2013.01); *F01N 2470/20* (2013.01); *F01N 2560/025* (2013.01); *Y02A 50/2324* (2018.01); *Y02T 10/22* (2013.01)

(58) Field of Classification Search
CPC ............. F01N 2340/02; F01N 2340/04; F01N 2470/10; F01N 2470/20; F01N 2560/025; F02B 75/18; F02B 77/086
See application file for complete search history.

(56) References Cited

U.S. PATENT DOCUMENTS

| | | | |
|---|---|---|---|
| 7,669,412 B2 * | 3/2010 | Ashida | F01N 13/10 60/313 |
| 8,459,016 B2 | 6/2013 | Ashida et al. | |
| 2003/0167759 A1 * | 9/2003 | Ashida | F01N 3/28 60/323 |
| 2003/0172648 A1 * | 9/2003 | Kobayashi | F01N 13/08 60/323 |
| 2004/0020195 A1 * | 2/2004 | Ashida | F01N 13/1805 60/302 |
| 2005/0115765 A1 * | 6/2005 | Minato | F01N 13/10 181/240 |

FOREIGN PATENT DOCUMENTS

| | | | |
|---|---|---|---|
| JP | 2002276357 A | 9/2002 | |
| JP | 2008115711 A | 5/2008 | |
| JP | 4424017 B2 | 3/2010 | |

* cited by examiner

| A/B | B=0 | B=0 | 5.11 | 1.94 | 3.50 | 4.00 | 4.60 | 5.00 | B=0 | B=0 | B=0 | 5.66 | 2.37 | 1.94 |
|---|---|---|---|---|---|---|---|---|---|---|---|---|---|---|
| C/A | 0.50 | 0.50 | 0.56 | 0.90 | 0.65 | 0.70 | 0.74 | 0.80 | 0.54 | 0.47 | 0.50 | 0.51 | 0.56 | 0.86 |
| EM DETERIORATION INDEX | 59 | 54 | 66 | 84 | 70 | 64 | 60 | 65 | 62 | 61 | 54 | 66 | 68 | 84 |
| 4 CYLINDERS AVERAGE γ | 0.83 | 0.88 | 0.85 | 0.92 | 0.89 | 0.92 | 0.93 | 0.91 | 0.87 | 0.88 | 0.88 | 0.85 | 0.86 | 0.92 |

EXHAUST DEVICE OF MULTI-CYLINDER ENGINE

FIELD OF THE INVENTION

The present invention relates to an exhaust device of a multi-cylinder engine.

BACKGROUND ART

According to Patent Document 1, an exhaust manifold of an internal combustion engine, which gathers exhaust lines of three cylinders arranged in a line to one flow passage at a downstream side end, includes a first exhaust passage extending rearward along the cylinder line direction of the internal combustion engine from the cylinder located at the foremost end and leading to the downstream side end, and a plurality of second exhaust passages, respective ends of which extend from the remaining cylinders and merge together into the first exhaust passage sequentially at different points in the axial direction of the first exhaust passage. Each second exhaust passage extends from each cylinder so as to coil around the circumference of the first exhaust passage when viewed from the front of the engine and merges together with the first exhaust passage from the opposite side direction of the cylinder head side in the circumferential direction. The first exhaust passage is configured by being divided into a branch pipe at the upstream side, an intermediate pipe successively joined together at the downstream side of the branch pipe, and an outlet pipe including ends of the downstream side. In addition, the ends of the branch pipes configuring each second exhaust passage are inserted and fixed into inlets of the intermediate pipe or the outlet pipe with the ends of the branch pipes or the intermediate pipes of the first exhaust passages.

RELATED ART

Patent Document

Patent document 1 U.S. Pat. No. 4,424,017

SUMMARY OF THE INVENTION

Problems to be Solved by the Invention

Recently, to promptly improve the exhaust gas purification performance of the multi-cylinder engine, the exhaust purification device is arranged relatively near the engine in order to increase promptly the temperature of a catalyst in the exhaust purification device by introducing the high temperature exhaust gas to the exhaust purification device.

However, there is a problem that technologies have not been established to improve the exhaust gas purification performance by making the flow rate of the exhaust gas substantially uniform throughout a treatment carrier such as a catalyst while improving dispersibility of the exhaust gas from each exhaust passage of the multi-cylinder engine to the catalyst and other components in the exhaust purification device.

The present invention is made in consideration of such a situation, and has as a subject improvement of the exhaust gas purification performance by making the flow rate of the exhaust gas nearly uniform throughout a treatment carrier like a catalyst as well as improvement of dispersibility of the exhaust gas from the multi-cylinder engine to the catalyst and other components in the exhaust purification device.

BRIEF SUMMARY OF THE INVENTION

In order to solve the above problem, the present invention forms each end of two collecting pipes or two branch pipes on the exhaust downstream side into a D-shaped cross sectional shape, and each D-shaped cross sectional shape comprises a first straight line part, a pair of second straight line parts that are connected with each end of the first straight line part respectively and are arranged to be substantially parallel to each other, and an arc part that connects the ends of the pair of second straight line parts on the opposite sides of the first straight line part to each other.

Specifically, the present invention has as an object an exhaust device of a multi-cylinder engine in which a plurality of cylinders are divided into two sets of cylinder groups that are configured by the plurality of cylinders, and two collecting pipes, configured by collecting together the branch pipes which each communicate with the cylinders of each of the two sets of cylinder groups, and connected with an exhaust purification device through a taper, and provides the following solution.

Therefore, in a first invention, the two collecting pipes are arranged at substantially symmetric positions across a partition which has a linear cross sectional shape and is arranged at the central part between the collecting pipes which are formed in D-shaped cross sectional shapes, respectively. Each D-shaped cross sectional shape comprises a first straight line part, a pair of second straight line parts that are connected with each end of the first straight line part respectively and are arranged to be substantially parallel to each other, and an arc part that connects the ends of the pair of second straight line parts on the opposite sides of the first straight line part to each other.

According to this, two collecting pipes are arranged at substantially symmetric positions across the partition which has the linear cross sectional shape and is arranged at the central part between the collecting pipes which are each formed in a D-shaped cross sectional shape. Additionally, each of these D-shaped cross sectional shapes comprises a first straight line part, a pair of second straight line parts that are connected with each end of the first straight line part respectively and are arranged to be substantially parallel to each other, and an arc part that connects the ends of the pair of second straight line parts on the opposite sides of the first straight line part to each other. Therefore, the exhaust gas can be released to the opposite side of the partition in each collecting pipe and can be suppressed from circulating in a concentrated manner to the partition side in each collecting pipe. Therefore, the exhaust gas can be suppressed from circulating in a concentrated manner at the central part in the exhaust purification device, and the flow rate of the exhaust gas throughout a treatment carrier, such as a catalyst, can be made to be nearly uniform while the dispersibility of the exhaust gas to the catalyst and other components in the exhaust purification device is improved. Accordingly, the exhaust gas purification performance can be improved.

Moreover, another invention is directed to an exhaust device of a multi-cylinder engine that is connected to two collecting pipes communicating with two cylinders respectively with an exhaust purification device through a taper, and provides the following solution.

That is, in the second invention, ends of the two branch pipes on the exhaust downstream side are arranged at substantially symmetric positions across a partition which has the linear cross sectional shape and is arranged at the central part between the ends of the two branch pipes which are each formed in a D-shaped cross sectional shape. Each of these D-shaped cross sectional shapes comprises a first straight line part, a pair of second straight line parts that are connected with each end of the first straight line part respectively and are arranged to be substantially parallel to each other, and an arc part that connects the ends of the pair of second straight line parts on the opposite sides of the first straight line part to each other.

According to this, ends of the two branch pipes on the exhaust downstream side are arranged at substantially symmetric positions across the partition which has the linear cross sectional shape and is arranged at the central part between the branch pipes which are each formed in the D-shaped cross sectional shapes. Each of these D-shaped cross sectional shapes comprises a first straight line part, a pair of second straight line parts that are connected with each end of the first straight line part respectively and are arranged to be substantially parallel to each other, and an arc part that connects the ends of the pair of second straight line parts on the opposite sides of the first straight line part to each other. Therefore, the exhaust gas can be released to the opposite side of the partition in the ends of each branch pipe on the exhaust downstream side and can be suppressed from circulating in a concentrated manner to the partition side in the ends of each branch pipe on the exhaust downstream side. Therefore, the exhaust gas can be suppressed from circulating in a concentrated manner at the central part in the exhaust purification device, and the flow rate of the exhaust gas throughout a treatment carrier like catalyst can be made to be nearly uniform while the dispersibility of the exhaust gas to the catalyst and other components in the exhaust purification device is also improved. Accordingly, the exhaust gas purification performance can be improved.

In a third invention according to the first invention, the multi-cylinder engine is a four-cylinder engine wherein each cylinder group comprises two cylinders of which the exhaust strokes are nonconsecutive with each other.

According to this, four cylinders are divided into two sets of cylinder groups configured by two cylinders, of which the exhaust strokes are nonconsecutive with each other, and the two collecting pipes are configured by collecting together the branch pipes which communicate with the two cylinders of each of the two sets of cylinder groups, so that high pressure exhaust pressure waves of each cylinder can be suppressed from interfering with each other and the exhaust efficiency can be improved. Therefore, the residual gas in a combustion chamber can be reduced.

A fourth invention according to any one of the first through third inventions comprises ends of the two collecting pipes or the two branch pipes on the exhaust downstream side extending diagonally downward toward the vehicle rear side, the exhaust purification device extending diagonally downward toward the vehicle rear side and being arranged so that the inclination is more horizontal than the inclinations of the ends of the two collecting pipes or the two branch pipes on the exhaust downstream side, and a recess part recessed inward of the taper and being formed with a sensor mounting part for mounting an exhaust sensor on the ends of the taper on the vehicle front side.

According to this, the ends of the two collecting pipes or the two branch pipes on the exhaust downstream side extend diagonally downward toward the vehicle rear side, the exhaust purification device extends diagonally downward toward the vehicle rear side and is arranged so that the inclination is more horizontal than the inclinations of the ends of the two collecting pipes or the two branch pipes on the exhaust downstream side, and the exhaust gas circulates in a concentrated manner at the vehicle front side in the exhaust purification device unless certain means are provided.

However, according to the fourth invention, since a recess part, which is recessed inward of the taper and is formed with a sensor mounting part for mounting an exhaust sensor, is formed on the ends of the taper on the vehicle front side, the exhaust gas circulating the vehicle front side of the taper is lead to the vehicle rear side by the recess part. Therefore, the dispersibility of the exhaust gas to the catalyst and other components in the exhaust purification device can be further improved, so that the exhaust gas purification performance can be further improved.

A fifth invention, according to any one of the first through fourth inventions, satisfies the following formulas (1) and (2) by defining a length of the first straight line part as A, a length of the second straight line parts as B, and a distance between the first straight line part and an end of the arc part on the convex side as C.

$$A/B = 4 \text{ to } 5 \tag{1}$$

$$C/A = 0.7 \text{ to } 0.8 \tag{2}$$

According to this, since A/B=4 to 5, and C/A=0.7 to 0.8, the exhaust gas can be released moderately to the opposite side of the partition in each collecting pipe or in the end of each branch pipe on the exhaust downstream side, and can be certainly suppressed from circulating in a concentrated manner at the partition side in each collecting pipe or in the ends of each branch pipe on the exhaust downstream side. Therefore, the exhaust gas can be suppressed from circulating in a concentrated manner at the central part in the exhaust purification device, and the flow rate of the exhaust gas throughout a treatment carrier, such as a catalyst, can be certainly be made to be substantially about uniform, while the dispersibility of the exhaust gas to the catalyst and other components in the exhaust purification device is further improved. Accordingly, the exhaust gas purification performance can be further improved.

EFFECTS OF THE INVENTION

According to the present invention, the ends of the two collecting pipes or two branch pipes on the exhaust downstream side are arranged at substantially symmetric positions across a partition part which has a linear cross sectional shape and is arranged at the central part between the ends of the pipes which are each formed in D-shaped cross sectional shapes. Since each of these D-shaped cross sectional shapes comprises a first straight line part, a pair of second straight line parts that are connected with each end of the first straight line part respectively and are arranged to be substantially parallel to each other, and an arc part that connects the ends of the pair of second straight line parts on the opposite sides of the first straight line part to each other, the exhaust gas can be released to the opposite side of the partition in each collecting pipe or in the ends of each branch pipe on the exhaust downstream side and can be suppressed from circulating in a concentrated manner at the partition side in each collecting pipe or in the ends of each branch pipe on the exhaust downstream side, and therefore, the exhaust gas can be suppressed from circulating in a concentrated manner at the central part in the exhaust purification device, and the flow rate of the exhaust gas throughout a treatment carrier such as a catalyst can be made substantially uniform while the dispersibility of the exhaust gas to the catalyst and other components in the exhaust purification device is improved, so that the exhaust gas purification performance can be improved.

DETAILED DESCRIPTION OF THE EMBODIMENTS

Hereinafter, embodiments of the present invention are described in detail based on the figures. The following descriptions of preferable embodiments are essentially intended to be exemplary only, and are not intended to limit the application, use, or scope of the invention.

Figure 1:
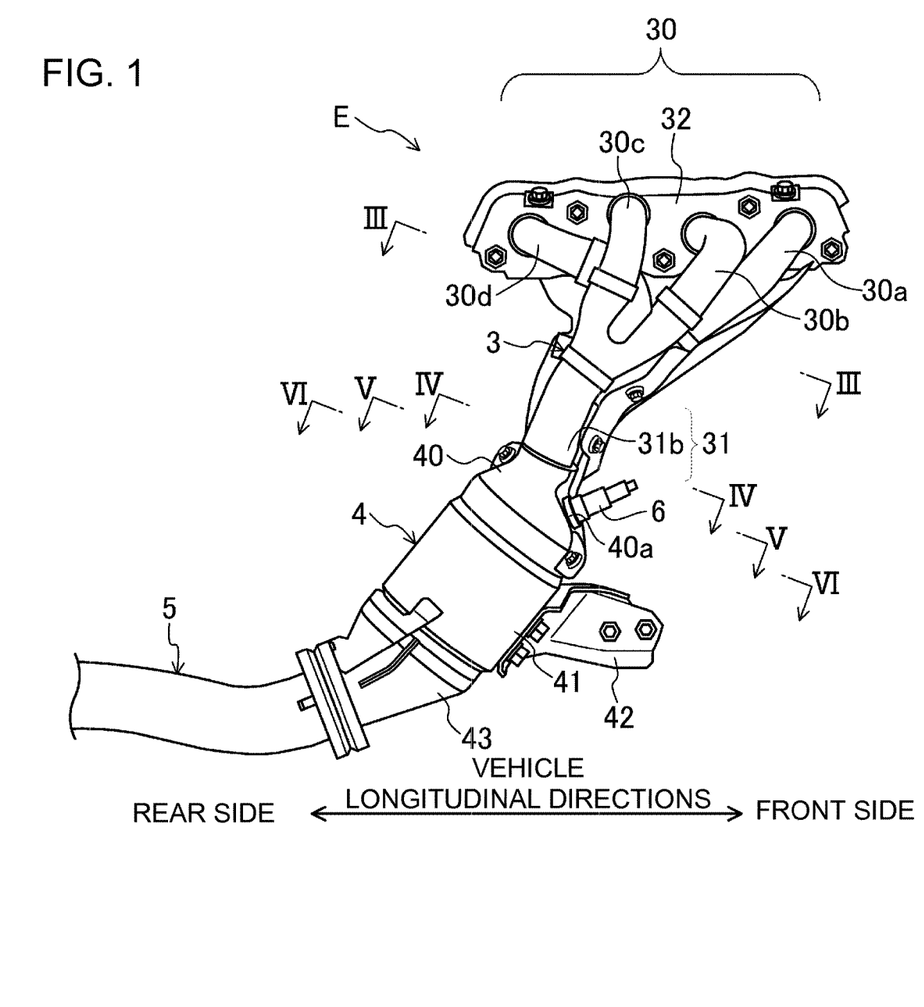
FIG. 1 is a side elevation view of an exhaust device according to an embodiment of the present invention viewed from the vehicle right side.

FIG. 1 shows an exhaust device E according to an embodiment of the present invention, and this exhaust device E is an exhaust device of a longitudinally mounted engine. This engine is an inline four-cylinder engine that has four cylinders in a line (not shown) and is longitudinally mounted in an engine room of the vehicle front part so that the cylinder line direction is in the vehicle longitudinal direction (the left and right directions in FIG. 1).

The exhaust device E for exhausting the exhaust gas in each cylinder of the engine is arranged at the vehicle right side of the engine. Hereinafter, this exhaust device E is described in detail with reference to FIGS. 1 through 7.

Figure 2:
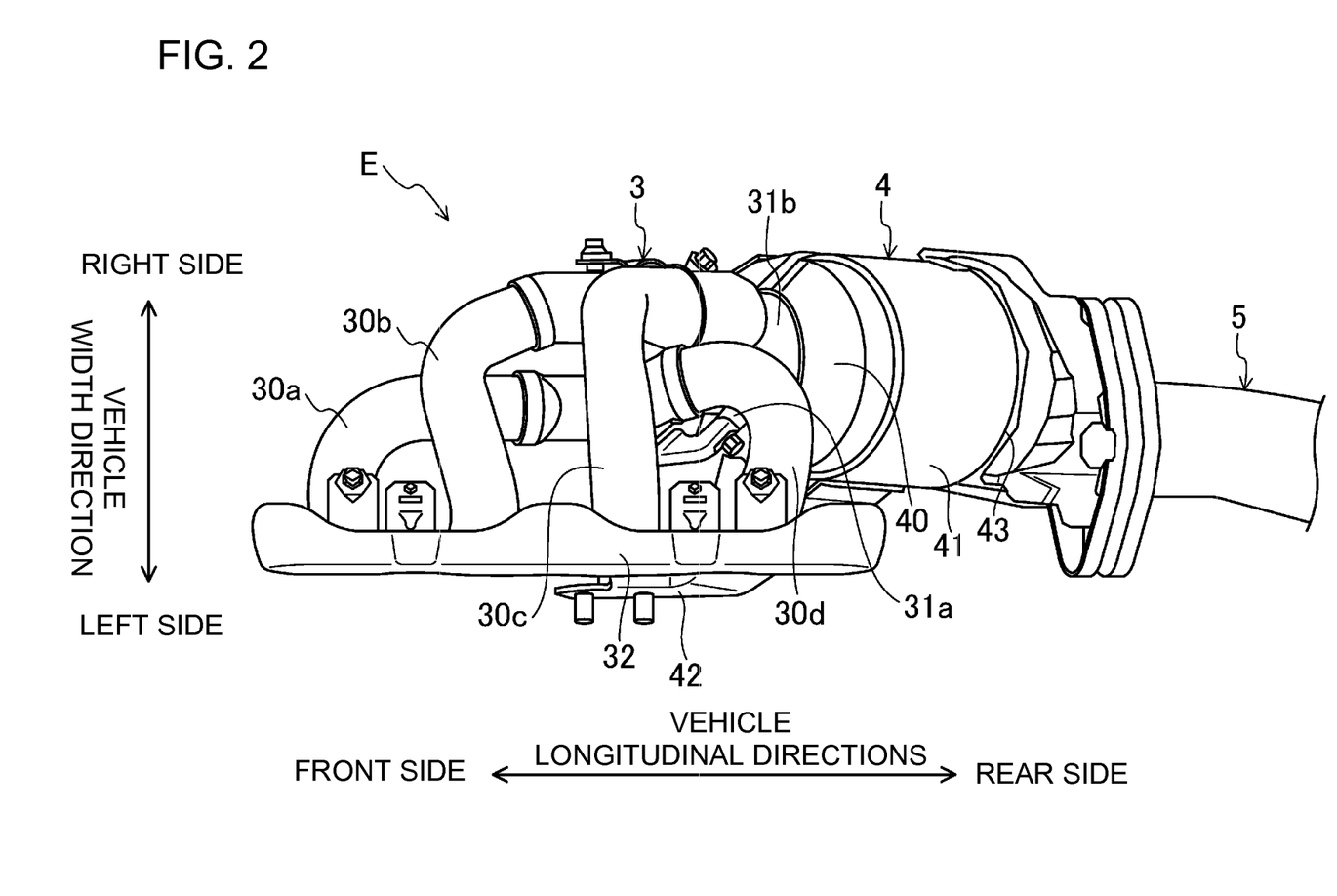
FIG. 2 is a plan view of the exhaust device viewed from the upper side.
Figure 3:
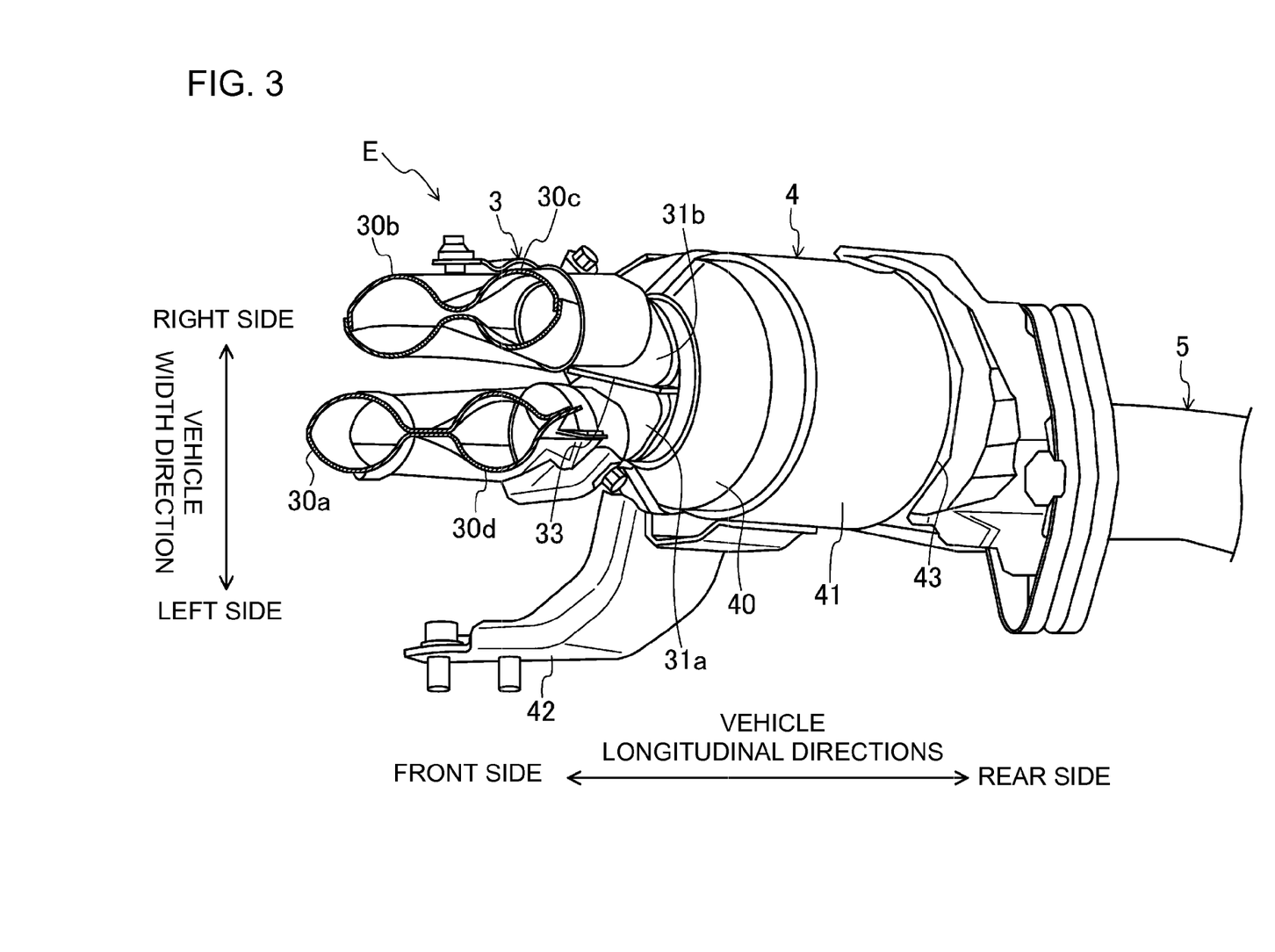
FIG. 3 is a sectional view of FIG. 2 taken along a line III-III of FIG. 1.
Figure 4:
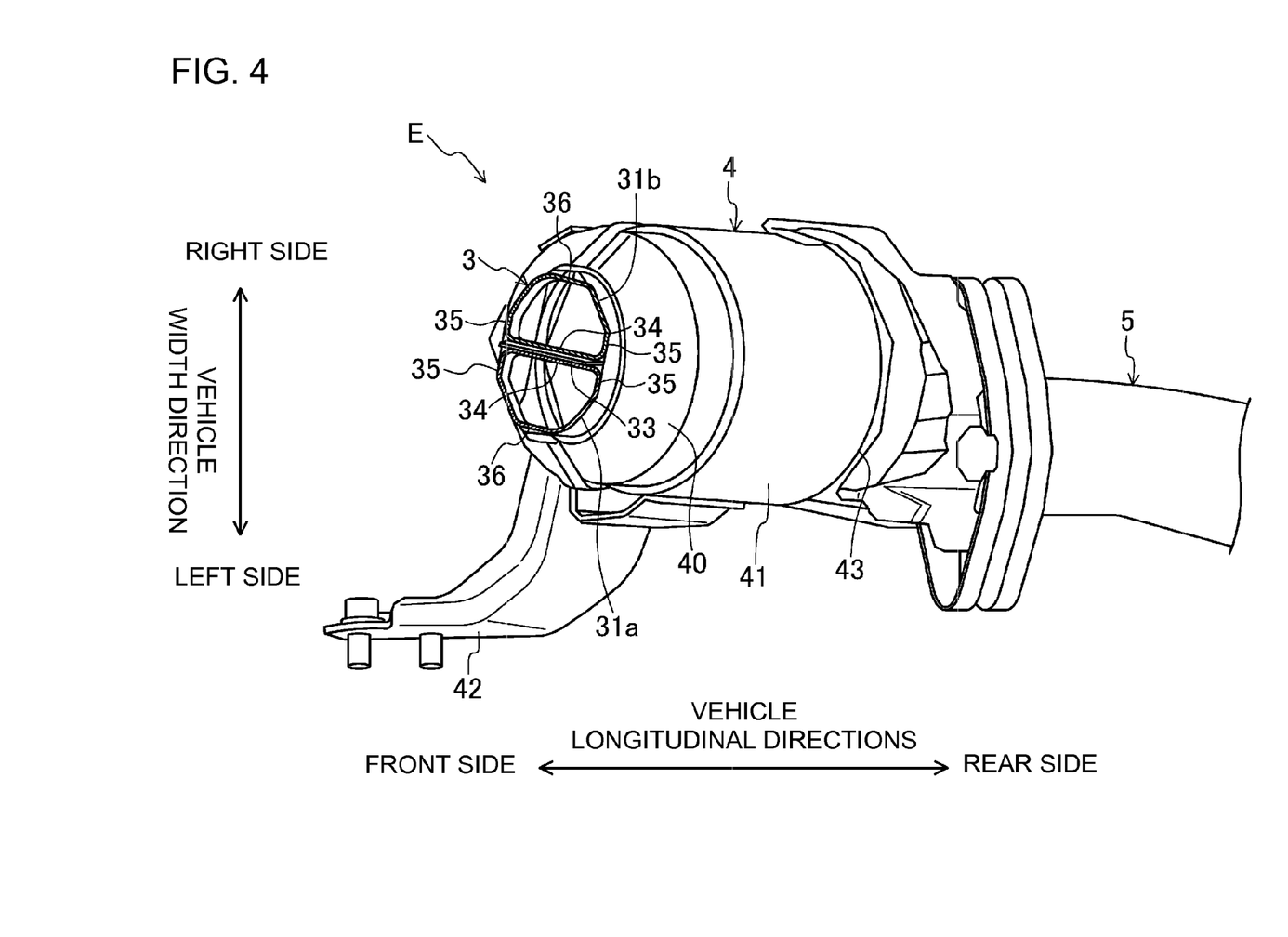
FIG. 4 is a sectional view of FIG. 2 taken along a line IV-IV of FIG. 1.
Figure 5:
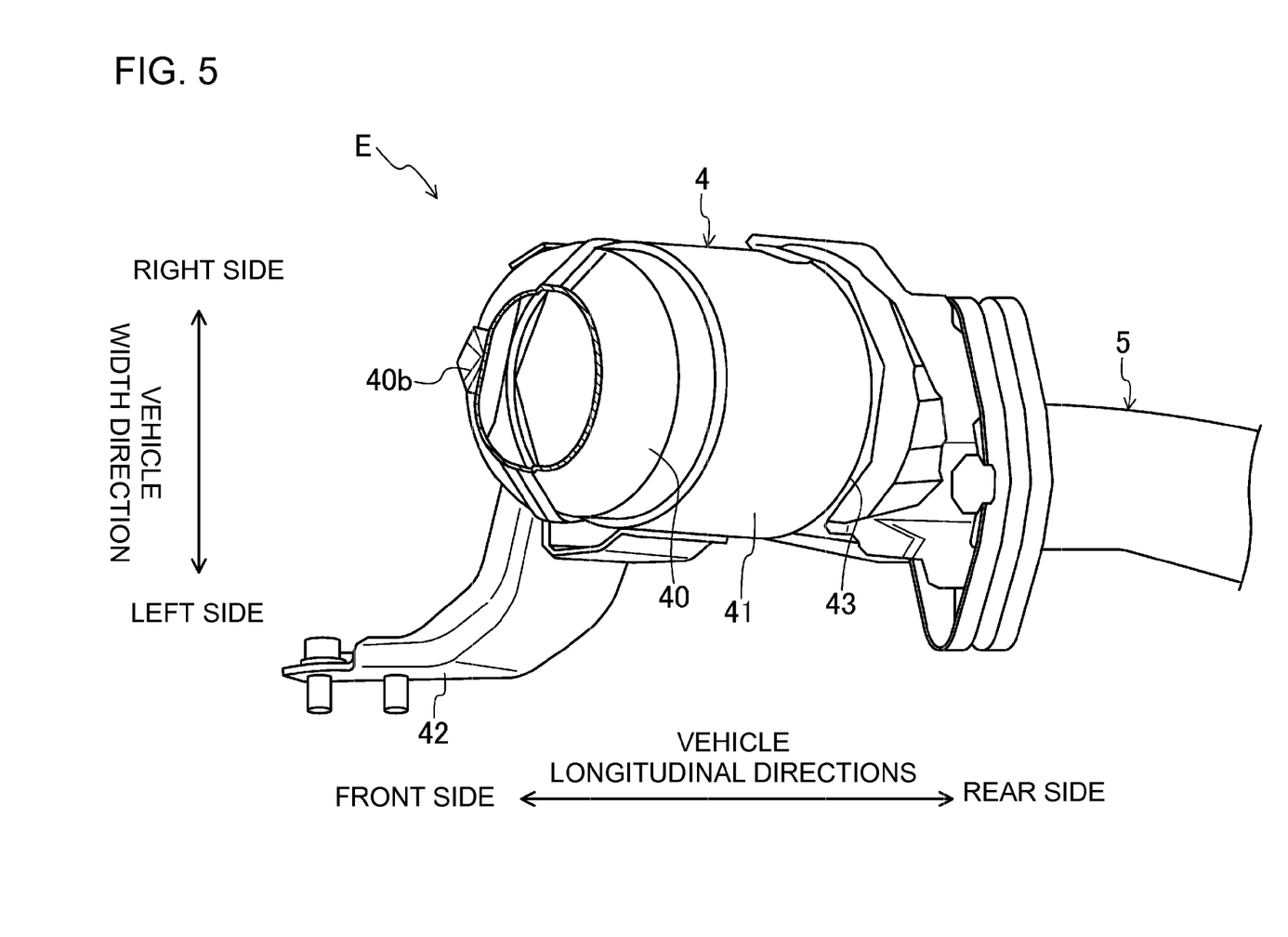
FIG. 5 is a sectional view of FIG. 2 taken along a line V-V of FIG. 1.
Figure 6:
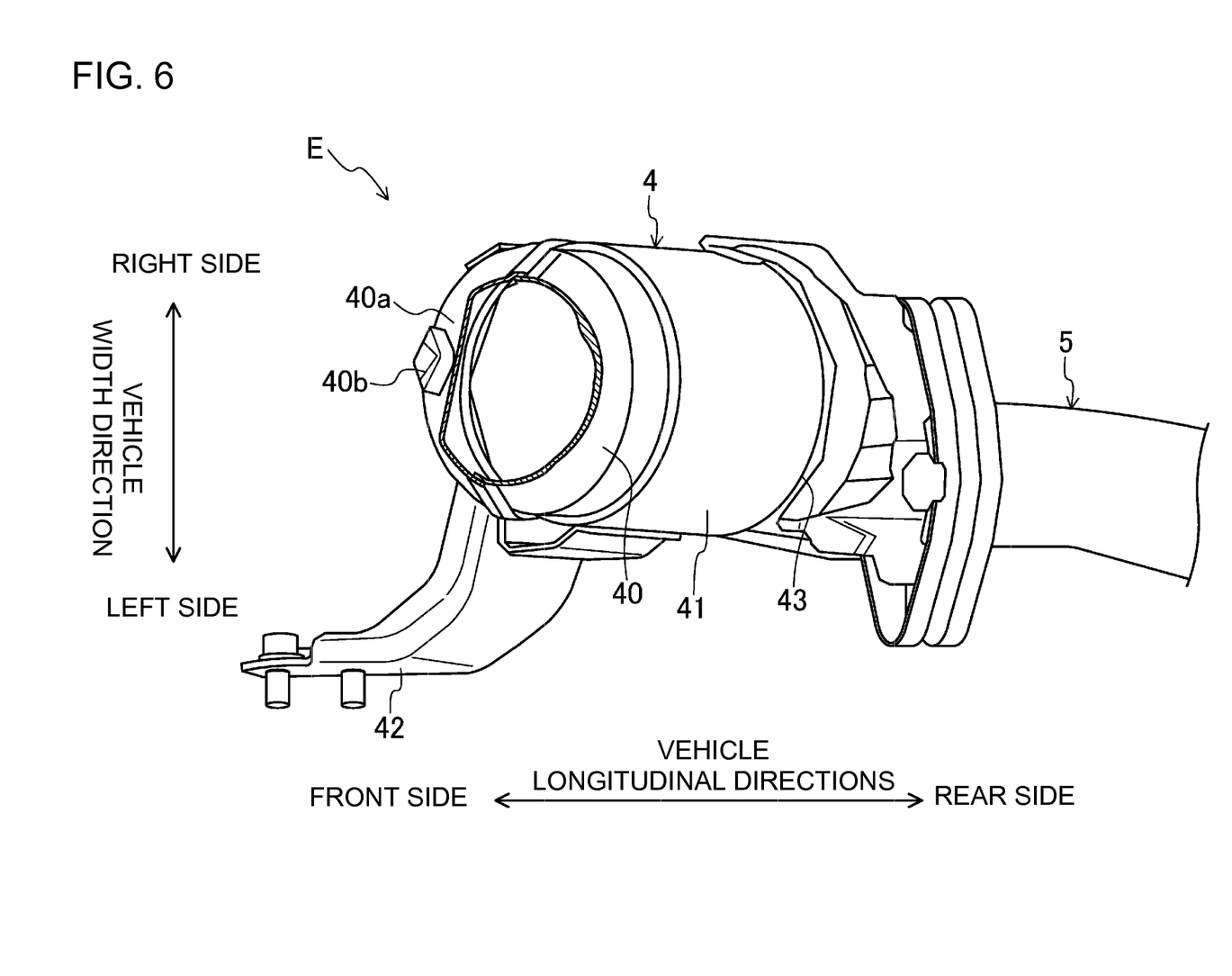
FIG. 6 is a sectional view of FIG. 2 taken along a line VI-VI of FIG. 1.

The exhaust device E is configured by an exhaust manifold 3, a catalyst 4 as an exhaust purification device of the engine, and a downstream side exhaust pipe 5, which are disposed in this order from an exhaust upstream side.

The exhaust manifold 3 includes four branch pipes 30 (30a to 30d), which communicate with four cylinders of the engine respectively, and two collecting pipes 31 (31a and 31b), each of which collects two of the four branch pipes 30 to each other. The catalyst 4 is connected to the end of these collecting pipes 31 on the exhaust downstream side through a taper 40 (the end of the catalyst 4 on the exhaust upstream side).

Hereinafter, the four cylinders are indicated as a first cylinder, a second cylinder, a third cylinder, and a fourth cylinder from the vehicle front side (the front side of the engine) toward the vehicle rear side (the rear side of the engine) in order (simply indicated as cylinders in some cases when there is no distinction). In addition, the branch pipes 30, which communicate with the first to the forth cylinders respectively, are indicated as first branch pipes 30a to 30d respectively (simply indicated as branch pipes 30 in some cases when there is no distinction).

One flange 32, which extends in the vehicle longitudinal direction shared by all branch pipes from 30a to 30d for mounting the first to fourth branch pipes 30a to 30d to the side surface of the engine on the vehicle right side, is arranged on the ends of the first to fourth branch pipes 30a to 30d on the exhaust upstream side, and by mounting this flange 32 to the side surface of the engine on the vehicle right side, the first to fourth branch pipes 30a to 30d communicate with the first to fourth cylinders respectively and are connected respectively with openings of four exhaust ports opened on the side surface of the engine on the vehicle right side.

The collecting pipes 31 are divided into two sets of cylinder groups, each configured with two cylinders, of which the exhaust strokes (expansion strokes) for all cylinders are nonconsecutive with each other, and are configured by collecting together the branch pipes 30 which communicate with the two cylinders of the cylinder groups for each set of cylinder groups. In the present embodiment, since the exhaust strokes execute from the first cylinder, the third cylinder, the fourth cylinder, and the second cylinder in that order, the cylinder groups are divided into one of the first cylinder and the fourth cylinder and another of the second cylinder and the third cylinder, and the collecting pipe 31a is configured by collecting the first branch pipe 30a and the fourth branch pipe 30d which communicate with the first cylinder and the fourth cylinder respectively, and the collecting pipe 31b is configured by collecting the second branch pipe 30b and the third branch pipe 30c which communicate with the second cylinder and the third cylinder respectively. Hereinafter, the collecting pipe 31a configured by collecting the first branch pipe 30a and the fourth branch pipe 30b is called the first collecting pipe part 31a, and the collecting pipe 31b configured by collecting the second branch pipe 30b and the third branch pipe 30c is called the second collecting pipe part 31b (simply indicated as collecting pipe 31 in some cases when there is no distinction).

The first branch pipe 30a extends diagonally downward toward the vehicle rear side after extending from the side surface (specifically, the flange 32) of the vehicle right side of the engine to the vehicle right side, the fourth branch pipe 30d extends diagonally downward toward the vehicle front side after extending from the side surface to the vehicle right side, and the first branch pipe 30a and the fourth branch pipe 30d gather to be the first collecting pipe part 31a at about the same position (near the center of the vehicle longitudinal direction of the flange 32) of the third cylinder in the vehicle longitudinal direction. Moreover, the second branch pipe 30b extends diagonally downward toward the vehicle rear side after extending from the side surface to the vehicle right side, the third branch pipe 30c extends to the lower side after extending from the side surface to the vehicle right side, and the second branch pipe 30b and the third branch pipe 30c gather to be the second collecting pipe part 31b at about the same position of the third cylinder (the first collecting pipe part 31a) in the vehicle longitudinal direction. The exhaust downstream side parts of the second branch pipe 30b and the third branch pipe 30c are located at the vehicle right side relative to the exhaust downstream side parts of the first branch pipe 30a and the fourth branch pipe 30d. Accordingly, the first to fourth branch pipes 30a to 30d (the exhaust passage from each exhaust port to the collecting pipe 31) are relatively long. Moreover, by collecting the first branch pipe 30a and the fourth branch pipe 30d, and collecting the second branch pipe 30b and the third branch pipe 30c, respectively, the scavenging effects can be improved. Therefore, the residual gas in the combustion chamber can be reduced.

The first collecting pipe part 31a and the second collecting pipe part 31b are arranged to deviate with each other in the vehicle width direction. Therefore, the first collecting pipe part 31a is located at the vehicle left side relative to the second collecting pipe part 31b in the vehicle width direction. The first collecting pipe part 31a and the second collecting pipe part 31b extend to a diagonally lower side toward the vehicle rear side and are connected to the taper 40 at about the same position as the fourth cylinder in the vehicle width direction.

In the present embodiment, the first collecting pipe part 31a and the second collecting pipe part 31b (specifically, exhaust downstream side parts of the first collecting pipe part 31a and the second collecting pipe part 31b) are arranged at substantially symmetric positions across a partition plate part 33 (a partition part), which has a linear cross sectional shape and is arranged at the central part between the pipe parts 31a and 31b which are each formed in a D-shaped cross sectional shape. Each of these D-shaped cross sectional shapes comprises a first straight line part 34, a pair of second straight line parts 35 that are connected with each end of the first straight line part 34 respectively and are arranged to be substantially parallel to each other, and a circular arc part 36 (arc part) that connects ends of the pair of second straight line parts 35 on opposite sides of the first straight line part 34 to each other. The partition plate part 33 is arranged so as to be a partition of the first collecting pipe part 31a and the second collecting pipe part 31b and extends to the vicinity of the end on the exhaust upstream side of the taper 40.

Figure 7:
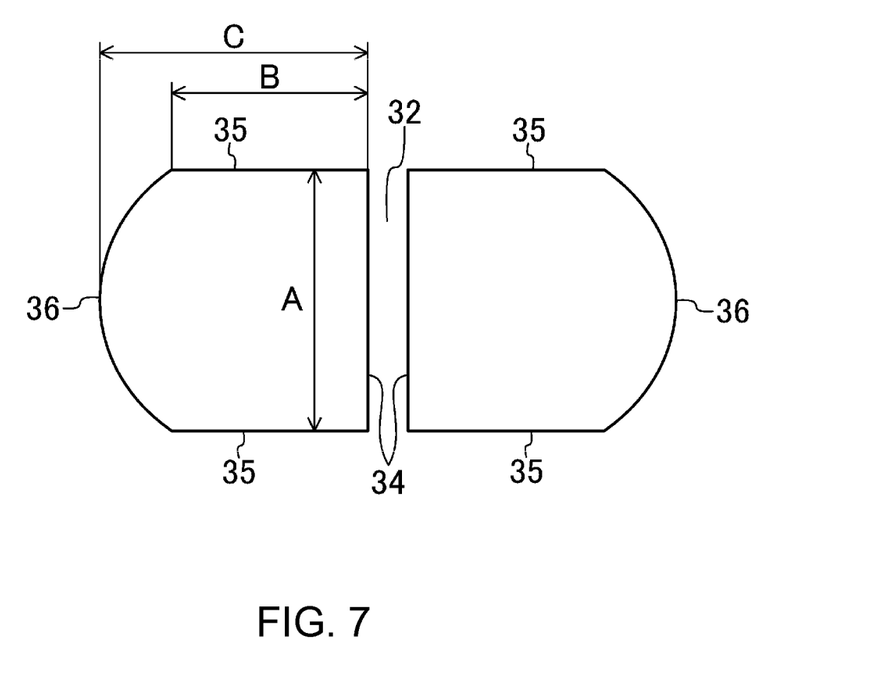
FIG. 7 is a schematic diagram of a D-shaped cross sectional shape of a collecting pipe.

The present embodiment satisfies the following formulas (1) and (2) by defining a length of the first straight line part 34 as A, a length of the second straight line parts 35 as B, and a distance between the first straight line part 34 and the end of the circular arc part 36 on the convex side as C.

$$A/B = 4 \text{ to } 5 \quad (1)$$

$$C/A = 0.7 \text{ to } 0.8 \quad (2)$$

These formulas (1) and (2) are satisfied, so that the following formulas (3) and (4) may be satisfied.

$$\text{EM deterioration index} \leq 65 \quad (3)$$

$$\gamma \geq 0.91 \quad (4)$$

Hereinafter, the relationships between A/B, C/A, the EM deterioration index, and the average γ of the four cylinders are described in detail with reference to FIG. 7 through FIGS. 10(a) and 10(b).

This EM deterioration index is a value determined by calculating a purification rate of each cell of the catalyst based on the exhaust gas flow velocity distribution characteristics of the end surface of catalyst measured by CAE (computer-aided engineering) analysis, and calculating a reduction of the purification rate throughout the catalyst in the case of the non-uniform flow rate of the exhaust gas compared with when the exhaust gas is circulated substantially uniformly throughout the catalyst (in the case of the substantially uniform flow rate of the exhaust gas throughout the catalyst).

In particular, the EM deterioration index is calculated as shown in 1 through 3 below.
1. The purification rate of each cell is estimated based on the value calculated based on the peak flow velocity distribution characteristics of the exhaust gas.
2. The purification rate throughout the catalyst is estimated by calculating an exhaust emission value by multiplying the transmittance (1—the purification rate) to the exhaust gas flow rate.
3. The EM deterioration rate for the case of the non-uniform flow rate of the exhaust gas is estimated based on the purification rate throughout the catalyst when the exhaust gas is circulated substantially uniformly throughout catalyst.

In addition, a threshold value "65" of the EM deterioration index is a value determined for each exhaust line by acquiring a correlation between the catalyst purification rate measured by the CAE analysis and the exhaust emission value of a real car.

The above-described γ is a value determined for each exhaust line based on the reliability (a temperature difference of the catalyst) and the exhaust emission value of the real car by acquiring a value measured from the CAE analysis and a correlation value between the catalyst temperature (multiple points temperature measurement) of the real car and the exhaust emission value of the real car. Moreover, the threshold value of γ is 0.91 as described above.

Here, by changing the values of A/B and C/A, the EM deterioration index and the average of the four cylinders γ are calculated. The results are shown in FIGS. 8 through 10(b).

Figure 8:
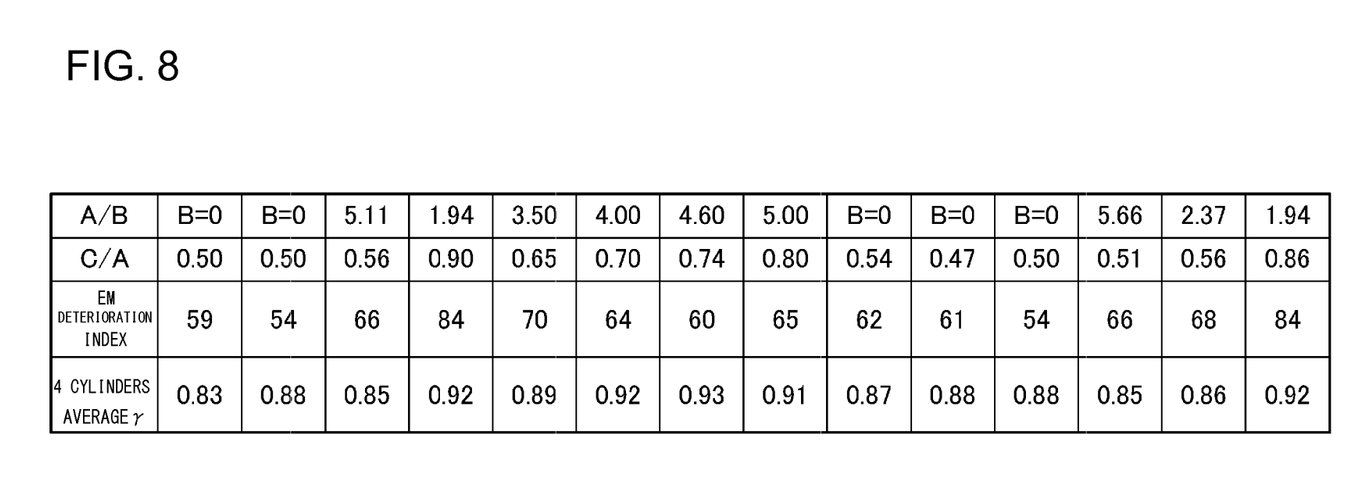
FIG. 8 is a diagram showing the relationship among A/B, C/A, the Emission (EM) deterioration index, and the average γ of the four cylinders.
Figure 9A:
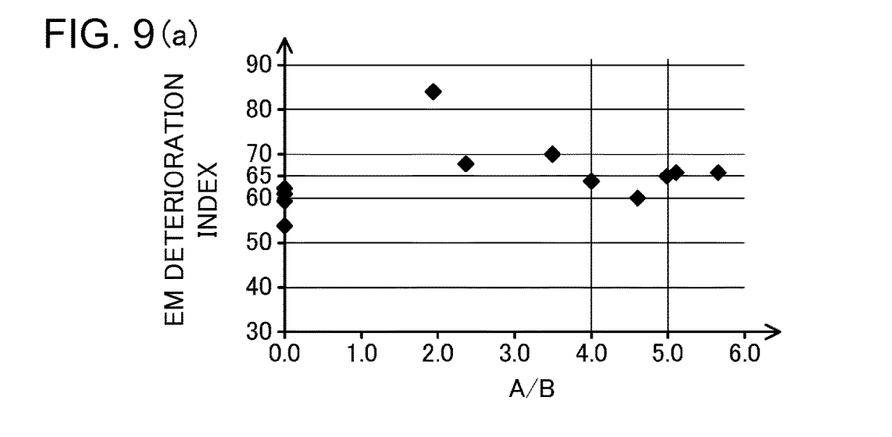
FIG. 9(a) is a graph showing the relationship between A/B and the EM deterioration index.
Figure 9B:
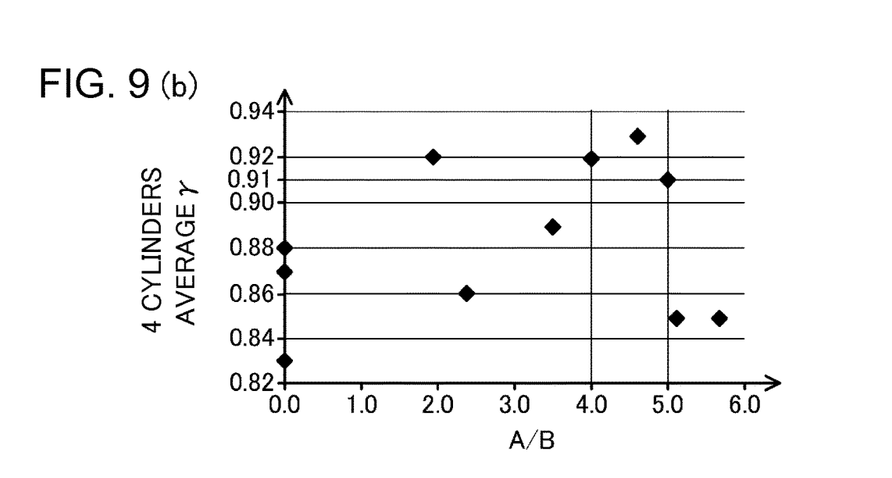
FIG. 9(b) is a graph showing the relationship between A/B and the average γ of the four cylinders.
Figure 10:
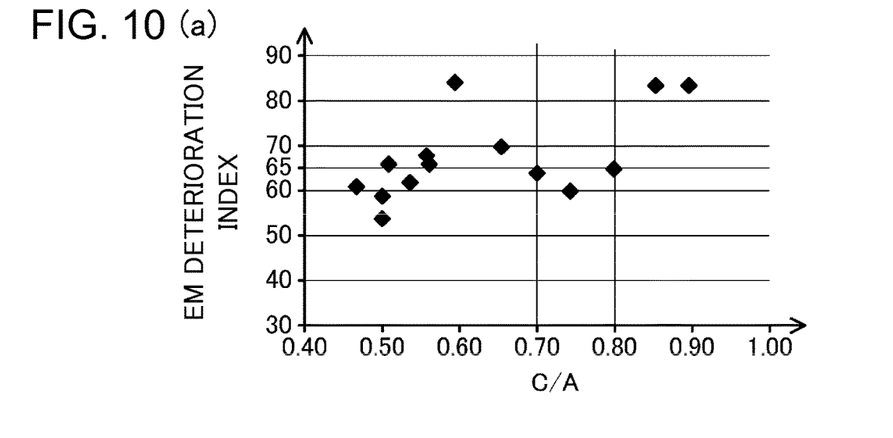
FIG. 10(a) is a graph showing the relationship between C/A and the EM deterioration index.
FIG. 10(b) is a graph showing the relationship between C/A and the average γ of four cylinders.

FIG. 8 is a diagram showing the relationship among A/B, C/A, the EM deterioration index, and the average γ of the four cylinders. FIG. 9(a) is a graph showing the relationship between A/B and the EM deterioration index, and FIG. 9(b) is a graph showing the relationship between A/B and the average γ of the four cylinders. FIG. 10(a) is a graph showing the relationship between C/A and the EM deterioration index, and FIG. 10(b) is a graph showing the relationship between C/A and the average γ of the four cylinders.

As is apparent from FIGS. 8 through 10(b), it was found that when A/B=4 to 5 and C/A=0.7 to 0.8 (the above formulas (1) and (2)) were satisfied, the EM deterioration index≤65, γ≥0.91 (the above formulas (3) and (4)) was satisfied.

Therefore, the present embodiment defined A/B=4 to 5, and C/A=0.7 to 0.8.

The taper 40 extends diagonally downward toward the vehicle rear side. The end of the taper 40 on the exhaust downstream side gradually enlarges in diameter substantially conically so as to have the same diameter as a case 41 described below of the catalyst 4, and the taper 40 is connected to the end surface of the case 41 on the exhaust upstream side at about the same position as the fourth cylinder in the vehicle width direction.

A recess part 40a recessed inward of the taper 40 is formed at the end of the taper 40 on the vehicle front side. A sensor mounting hole 40b (a sensor mounting part) for mounting an exhaust sensor 6 (shown only in FIG. 1) to detect an exhaust characteristic (oxygen concentration according to the present embodiment) is formed at the recess part 40a. This sensor mounting hole 40b is located on the extension of the partition plate part 33 in an axial direction view of the case 41. Detection signals of the exhaust sensor 6 are sent to an engine ECU (not shown) where a fuel injection amount of the engine and the EGR amount are controlled based on the detection signals. This exhaust sensor 6 is an oxygen concentration sensor ($O_2$ sensor) using zirconia ceramic.

So as to promptly improve the exhaust gas purification performance, the catalyst 4 is arranged relatively near the engine in order to increase promptly the catalyst temperature in the catalyst 4 by introducing the high temperature exhaust gas to the catalyst 4. The catalyst 4 extends diagonally downward toward the vehicle rear side so that the gas flow passage in the case 41 extends diagonally downward toward the vehicle rear side, and is arranged so that the inclination is more horizontal (slope is slightly flatter) than the inclinations of the first collecting pipe part 31a and the second collecting pipe part 31b.

Moreover, the catalyst 4 is configured by arranging the catalyst in the gas flow passage in the substantially cylindrical shaped case 41. A cross section of a catalyst arrangement part (not shown) of the gas flow passage in the case 41 is a substantially circular shape. The catalyst is a three-way catalyst for purifying HC and CO. Further, the cross sectional shape of the catalyst arrangement part is not limited to be a substantially circular shape.

The catalyst 4 is supported by being mounted to the side surface of the engine on the vehicle right side. That is, a support member 42 protruding to the vehicle's front side is fixed to the case 41 and the catalyst 4 is supported to the side surface of the engine on the vehicle right side by this support member 42.

A downstream side exhaust pipe 5 is connected to the end surface of the catalyst 4 on the exhaust downstream side of the case 41 through the taper 43 (the end surface of the catalyst 4 on the exhaust downstream side). This downstream side exhaust pipe 5 extends from a connection part (the end on the exhaust upstream side) of the catalyst 4 toward the rear of the vehicle.

—Effects—

From the above, according to the present embodiment, two collecting pipes 31 are arranged at substantially symmetric positions across the partition plate part 33, which has a linear cross sectional shape and is arranged at the central part between the pipes 31 which are each formed into a D-shaped cross sectional shape. Moreover, each of these D-shaped cross sectional shapes comprises a first straight line part 34, a pair of second straight line parts 35 that are connected with each end of the first straight line part 34 respectively and are arranged to be substantially parallel to each other, and a circular arc part 36 that connects ends of the pair of second straight line parts 35, which are on the opposite sides of the first straight line part 34, to each other. Therefore, the exhaust gas can be released to the opposite side of the partition plate part 33 in each collecting pipe 31 and can be suppressed from circulating in a concentrated manner to the partition plate part 33 sides in the collecting pipes 31. Therefore, the exhaust gas can be suppressed from circulating in a concentrated manner at the central part in the catalyst 4, and the flow rate of the exhaust gas throughout the catalyst can be made to be nearly uniform while the dispersibility of the exhaust gas to the catalyst in the catalyst 4 is improved. Accordingly, the exhaust gas purification performance can be improved.

Moreover, the four cylinders are divided into two sets of cylinder groups each configured with two cylinders, of which the exhaust strokes are nonconsecutive with each other, and the two collecting pipes 31 are configured by collecting together the branch pipes 30 which each communicate with the two cylinders of each of the two sets of cylinder groups, so that the exhaust high pressure waves of each cylinder can be suppressed from interfering with each other and the exhaust efficiency can be improved. Therefore, the residual gas in a combustion chamber can be reduced.

Moreover, since the two collecting pipes 31 extend diagonally downward toward the vehicle rear side and the catalyst 4 extends diagonally downward toward the vehicle rear side and is arranged so that the inclination is more horizontal than the inclinations of the two collecting pipes 31, the exhaust gas circulates in a concentrated manner at the vehicle front side in the catalyst 4 unless certain means are provided.

However, according to the present embodiment, since the recess part 40a, which is recessed inward of the taper 40 and is formed with the sensor mounting hole 40b for mounting the exhaust sensor 6, is formed on the ends of the taper 40 on the vehicle front side, the exhaust gas circulating the vehicle front side in the taper 40 is lead to the vehicle rear side by the recess part 40a. Therefore, the dispersibility of the exhaust gas to the catalyst in the catalyst 4 can be further improved, so that the exhaust gas purification performance can be further improved.

Moreover, since A/B=4 to 5, and C/A=0.7 to 0.8, the exhaust gas can be released moderately to the opposite side of the partition plate part 33 in each collecting pipe 31, and can certainly be suppressed from circulating in a concentrated manner to the partition plate part 33 side in each collecting pipe 31. Therefore, the exhaust gas can be suppressed from circulating in a concentrated manner in the central part in the catalyst 4, and the flow rate of the exhaust gas throughout catalyst can be made to be certainly substantially uniform while the dispersibility of the exhaust gas to catalyst in the catalyst 4 is improved. Accordingly, the exhaust gas purification performance can be further improved.

(Other Embodiments) In the embodiment, the engine is mounted longitudinally but it may also be mounted transversely.

Moreover, although the engine according to the embodiment is an inline four-cylinder engine, the engine is not limited as such as long as the engine includes a plurality of cylinders and, for example, may be an inline 2-cylinder engine, an inline 6-cylinder engine, or an inline 8-cylinder engine. Further, it may be a V-type engine of a plurality of cylinders.

In the case of an inline two-cylinder engine, two branch pipes 30 that communicate with two cylinders respectively are connected to the catalyst 4 through the taper 40. The ends of the two branch pipes 30 on the exhaust downstream side are arranged at substantially symmetric positions across the partition plate part, which has the linear cross sectional shape and is arranged at the central part between the two branch pipes 30 which are each formed in a D-shaped cross sectional shape. Each of these D-shaped cross sectional shapes comprises a first straight line part, a pair of second straight line parts that are connected with each end of the first straight line part respectively and are arranged to be substantially parallel to each other, and an arc part that connects the ends of the pair of second straight line parts on the opposite side of the first straight line part to each other.

According to this, the exhaust gas can be released to the opposite side of the partition plate part in the end of each branch pipe 30 on the exhaust downstream side and can be suppressed from circulating in a concentrated manner to the partition plate part side in the end of each branch pipe 30 on the exhaust downstream side. Therefore, the exhaust gas can be suppressed from circulating in a concentrated manner at the central part in the catalyst 4, and the flow rate of the exhaust gas throughout the catalyst can be nearly uniform while the dispersibility of the exhaust gas to catalyst in the catalyst 4 is improved. Accordingly, the exhaust gas purification performance can be improved.

Moreover, although the arc part in the embodiment according to the present invention is defined as the circular arc part 36, it may be a flexure part that bends into a bow shape.

Further, although the exhaust sensor 6 is defined in the embodiment as the $O_2$ sensor for detecting oxygen concentration as an exhaust character, the exhaust sensor 6 is not limited as such and, for example, may be a temperature sensor for detecting an exhaust temperature as the exhaust character.

Additionally, although the embodiment defined A/B=4 to 5, and C/A=0.7 to 0.8, as long as the exhaust gas purification performance can be improved, A/B and C/A are not limited as such.

Moreover, although the embodiment defined the catalyst 4 as the exhaust purification device, the catalyst 4 is not limited as such and, for example, may be an exhaust purification device to catch process exhaust particulates by supporting the catalyst components.

INDUSTRIAL APPLICABILITY

As described above, the exhaust device for a multi-cylinder engine according to the present invention can be applied for uses requiring improvement of the exhaust gas purification performance by making the flow rate of the exhaust gas substantially uniform throughout a treatment carrier such as a catalyst while improving dispersibility of the exhaust gas from the multi-cylinder engine to the catalyst and other components in the exhaust purification device.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

EXPLANATION OF REFERENCE CHARACTERS

3 Exhaust manifold
30 Branch pipe
31 Collecting pipe
33 Partition plate part (partition part)
34 First straight line part
35 Second straight line part
36 Circular arc part (arc part)
4 Catalyst (Exhaust purification device)
40 Taper
40*a* Recess part
40*b* Sensor mounting hole (Sensor mounting part)
6 Exhaust sensor

We claim:

1. An exhaust device of a multi-cylinder engine that connects two collecting pipes communicating with two cylinders respectively with an exhaust purification device through a taper, comprising:
 a D-shaped cross sectional shape formed respectively by downstream ends of the two collecting pipes and arranged at substantially symmetric positions across a partition part that has a linear cross sectional shape and is arranged at a central part between the two collecting pipes,
 wherein the D-shaped cross sectional shape includes a first straight line part, a pair of second straight line parts that are connected with each end of the first straight line part respectively and are arranged to be substantially parallel to each other, and an arc part that connects ends of the pair of second straight line parts on opposite sides of the first straight line part to each other;
 wherein the exhaust purification device is arranged so that an inclination of the exhaust purification device is different from inclinations of the collecting pipes;
 wherein a recessed part is formed at a vehicle front side of the taper so as to intersect an extending line that is parallel to the partition part and extends in a direction transverse to an exhaust flow direction of the two collecting pipes at the partition part, such that an exterior wall of the recessed part is recessed inwardly into the taper, and exhaust gas is directed toward a center of the exhaust purification device by the recessed part; and
 wherein ends of the two collecting pipes extend diagonally downward in a downstream direction toward a vehicle rear side, the exhaust purification device extends diagonally downward toward the vehicle rear side and is arranged so that the inclination thereof is more horizontal than inclinations of the ends of the two collecting pipes, and the recessed part recessed inwardly into the taper is formed as a sensor mounting part for mounting an exhaust sensor on ends of the taper on the vehicle front side.

2. The exhaust device of the multi-cylinder engine according to claim 1, wherein the following formulas (1) and (2) are satisfied by defining a length of the first straight line part as A, a length of the second straight line parts as B, and a distance between the first straight line part and an end of the arc part on a convex side as C:

$$A/B=4 \text{ to } 5 \quad (1)$$

$$C/A=0.7 \text{ to } 0.8 \quad (2).$$

3. An exhaust device of a multi-cylinder engine that divides a plurality of cylinders to two sets of cylinder groups formed by the plurality of cylinders, comprising:
 branch pipes which communicate with cylinders of the cylinder groups for each of the two sets of cylinder groups;
 two collecting pipes configured by collecting the branch pipes to be connected with an exhaust purification device through a taper; and
 a D-shaped cross sectional shape formed by the two collecting pipes respectively being arranged at substantially symmetric positions across a partition part that has a linear cross sectional shape and is arranged at a central part between the two collecting pipes,
 wherein the D-shaped cross sectional shape includes a first straight line part, a pair of second straight line parts that are connected with each end of the first straight line part respectively and are arranged to be substantially parallel each other, and an arc part that connects ends of the pair of second straight line parts on the opposite sides of the first straight line part to each other;

wherein the partition part, provided between the two collecting pipes, has a component that extends in a cylinder line direction across the cylinders of the engine;

wherein the two collecting pipes and the exhaust purification device extend in a diagonally downward direction including a component in the cylinder line direction toward a vehicle rear side, so that gas flow passages within a case of the exhaust purification device extend diagonally downward toward the vehicle rear side;

wherein a recessed part is formed so as to intersect an extending line that is parallel to the partition part and extends in a direction transverse to an exhaust flow direction of the two collecting pipes at the partition part, such that an exterior wall of the recessed part is inwardly recessed into the taper at an upward end, in the cylinder line direction, of the taper; and wherein an inclination of the exhaust purification device is arranged to be more horizontal than inclinations of the two collecting pipes.

* * * * *